United States Patent [19]

Herzberg et al.

[11] Patent Number: 5,881,108
[45] Date of Patent: Mar. 9, 1999

[54] ADAPTIVE PRE-EQUALIZER FOR USE IN DATA COMMUNICATIONS EQUIPMENT

[75] Inventors: Hanan Herzberg, Morganville; Ehud Langberg, Ocean Township, Monmouth County; Jin-Der Wang, Ocean; Jean-Jacques Werner, Holmdel, all of N.J.

[73] Assignee: Globespan Technologies, Inc., Largo, Fla.

[21] Appl. No.: 605,404

[22] Filed: Feb. 22, 1996

[51] Int. Cl.[6] .......................... H04B 15/00; H04L 25/03; H04L 25/49
[52] U.S. Cl. ............................. 375/296; 375/285
[58] Field of Search ..................... 375/296, 285, 375/346, 232, 233, 348, 278, 284, 221, 222, 231; 364/724.2, 724.19; 455/63; 333/18

[56] References Cited

U.S. PATENT DOCUMENTS

| | | | |
|---|---|---|---|
| 4,577,329 | 3/1986 | Brie et al. | 375/232 |
| 4,866,736 | 9/1989 | Bergmans | 375/290 |
| 5,008,903 | 4/1991 | Betts et al. | 375/296 |
| 5,251,328 | 10/1993 | Shaw | 455/73 |
| 5,263,051 | 11/1993 | Eyuboglu | 375/285 |
| 5,291,520 | 3/1994 | Cole | 375/296 |
| 5,513,216 | 4/1996 | Gadot et al. | 375/233 |
| 5,646,957 | 7/1997 | Im et al. | 375/234 |

OTHER PUBLICATIONS

United States Patent Application by Jin–Der Wang, entitled "A Hybrid Equalizer Arrangement for Use in Data Communications Equipment", Serial No. 08/322878, filed on Oct. 13, 1994.
United States Patent Application by S. Gadot et al., entitled "A Hybrid Equalizer Arrangement for Use in Data Communications Equipment", Serial No. )8/322877, filed on Oct. 13, 1994.

Primary Examiner—Stephen Chin
Assistant Examiner—Betsy L. Deppe
Attorney, Agent, or Firm—Thomas, Kayden, Horstemeyer & Risley

[57] ABSTRACT

The problem of error propagation is resolved by using the communications channel to adapt a pre-equalizer of a transmitter, in response to changes in the communications channel. In particular, the pre-equalizer adapts to changes in the communications channel by processing an error signal that is communicated over a reverse channel by a corresponding receiver.

16 Claims, 4 Drawing Sheets

COMMUNICATIONS PHASE

COMMUNICATIONS PHASE

COMMUNICATIONS PHASE

ADAPTIVE PRE-EQUALIZER FOR USE IN DATA COMMUNICATIONS EQUIPMENT

CROSS-REFERENCE TO RELATED APPLICATION

Related subject matter is disclosed in the co-pending, commonly assigned, U.S. patent applications of: J-D. Wang, entitled "A Hybrid Equalizer Arrangement for Use in Data Communications Equipment," Ser. No. 08/322,878, filed on Oct. 13, 1994 and Gadot et al. entitled "A Hybrid Eqqualizer Arrangement for Use in Data Communication Equipment," Ser. No. 08/322,877, filed on Oct. 13, 1994.

BACKGROUND OF THE INVENTION

The present invention relates to data communications equipment, e.g., modems, and, more particularly, to the equalization of signals in a data communications system.

Conventionally, a receiver employs an adaptive decision feedback equalizer (DFE) to compensate for distortion introduced by the communications channel. However, the use of a DFE introduces "error propagation" effects in the receiver. As such, it is known in the art to use pre-equalization with modulo arithmetic (e.g., Tomlinson filtering) in the far-end transmitter in order to mitigate, if not eliminate, the problem of error propagation in the receiver. This pre-equalizer uses equalizer coefficient values communicated from the receiver, typically over a reverse channel. These coefficient values are generated in the receiver as the result of an initialization phase, or training, between the far-end transmitter and the receiver.

However, if the response, i.e., characteristics, of the communications channel changes significantly, the pre-equalizer will not be able to compensate for the error propagation problem in the receiver. As a result, a re-train is required so that the receiver can generate a new set of pre-equalizer coefficients, which must be then sent back to the far-end transmitter. Unfortunately, each re-train takes time to both calculate the pre-equalizer coefficients anew and to communicate them back to the far-end transmitter over what is typically a low bandwidth reverse channel.

SUMMARY OF THE INVENTION

In accordance with the invention, the foregoing error propagation problem is solved by using the communications channel to adapt a set of coefficients of a pre-equalizer of a transmitter.

In accordance with an embodiment of the invention, a transmitter includes a pre-equalizer. The latter adapts to changes in the communications channel by using an error signal that is communicated over a reverse channel by a corresponding receiver. As a result, no re-trains are required and the error signal typically requires less bandwidth than a set of coefficient values.

DETAILED DESCRIPTION

Figure 1:
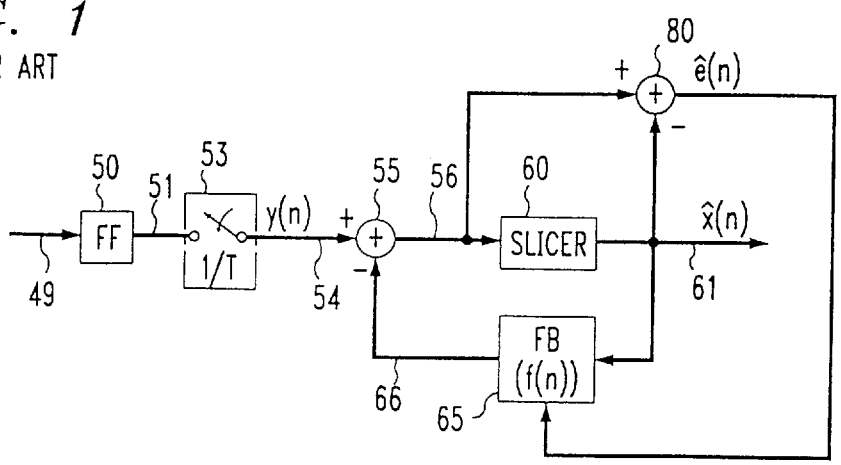
FIG. 1 is a block diagram of a prior art DFE.

Before describing the inventive concept, a general overview of DFE operation is presented. (General information on DFEs can also be found in publications such as "Data Communications Principles," by R. D. Gitlin, J. F. Hayes, and S. B. Weinstein, Plenum Press, 1992.) FIG. 1 shows a prior art DFE that includes feedforward filter (FF) 50, sampler 53, adder 55, slicer 60, adder 80, and feedback filter (FB) 65. A received data signal 49 is applied to feed forward filter 50 for processing. Feedforward filter 50 whitens the noise present in the received data signal. The output signal from feedforward filter 50 is applied, via sampler 53, to adder 55, which, theoretically, subtracts the inter-symbol interference (ISI) estimated by feedback filter 65 (described further below). Adder 55 provides a signal, 56, to slicer 60. The latter selects a particular data symbol as a function of the mapping of the signal, 56, into a predefined constellation of data symbols (not shown) to provide $\hat{x}(n)$, which is an estimate of a transmitted data symbol, $\hat{x}(n)$. The signal $\hat{x}(n)$ typically represents a stream of data symbols occurring at a symbol rate of 1/T seconds and is provided for processing by feedback filter 65 and by other receiver circuitry (not shown) to recover the actually transmitted data. (For example, if trellis coding is used, x(n) is subsequently processed by a Viterbi decoder).

Feedback filter 65 is a finite-impulse-response (FIR) having an impulse response represented by vector $\underline{f}(n)$. As mentioned above, feedback filter 65 uses the estimate, $\hat{x}(n)$, of the transmitted data to predict the amount of ISI to remove from the received signal. Adaptation of feedback filter 65 is performed by using $\hat{e}(n)$ as an error signal, which is developed by adder 80. For illustration, it is assumed that a least-mean-square (LMS) algorithm is used to adapt the coefficients of feedback filter 65. As such, then the i-th coefficient (i=0, 1, . . . , N−1) at the time instant n, $f_i(n)$, is given by:

$$f_i(n+1) = f_i(n) + 2\mu\hat{e}(n)\hat{x}(n-i), \tag{1}$$

where $\mu$ is the adaptation step size. (For simplicity, this description assumes the use of real filters and real data. However, the inventive concept is also applicable to complex filters and data as well.)

The DFE structure of FIG. 1 is based on the assumption that $\hat{x}(n)$ is a good estimation of the transmitted data x(n). As long as this estimate of the transmitter symbol currently received is, in fact, correct, there is no problem. However, if the estimate of the currently transmitted symbol is wrong, then the feedback section adds this error to the next received symbol and error propagation occurs. As a result, as known in the art, a form of non-linear preceding is typically used in the far-end transmitter to minimize error propagation.

In precoding there are two phases of receiver operation. In the first phase, the "initialization" phase, the DFE of the receiver, illustrated in FIG. 1, adapts to a standard test signal, or training sequence, received from a transmitter (described below). This phase is also referred to in the art as a "start-up," or "training" phase. Typically, there is no precoding of this test signal by the transmitter. Once the DFE adapts, the resulting set of coefficient values, $f_i(n)$, (i=0, 1, . . . , N−1), of the DFE are transmitted back to the transmitter, e.g., over a reverse channel.

Figure 2:
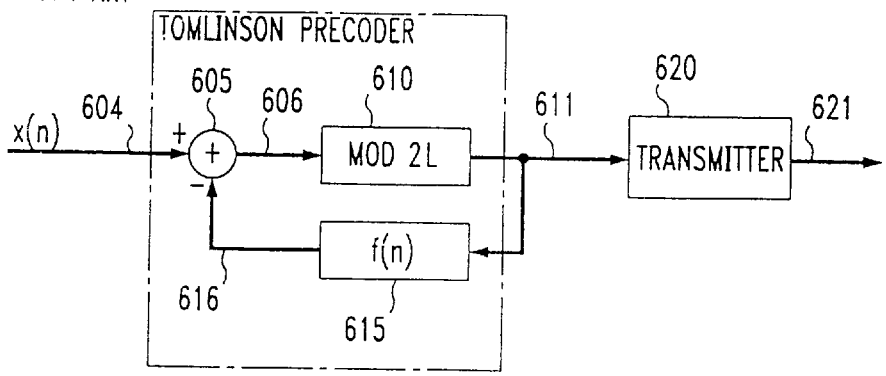
FIG. 2 is a block diagram of a prior art precoder.
Figure 3:
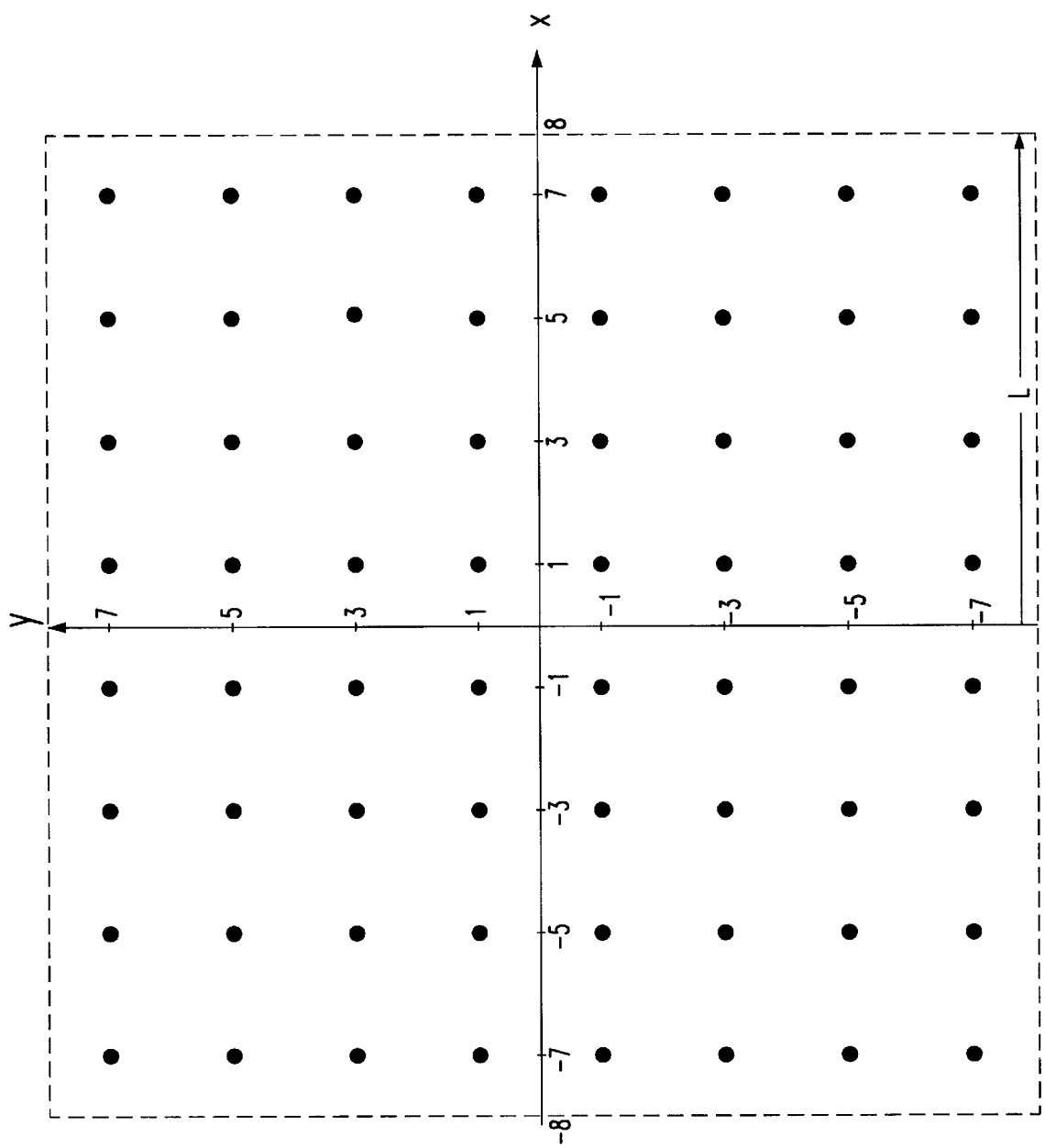
FIG. 3 is an illustrative signal point constellation for use in the precoder of FIG. 2.

At this point, the second phase, i.e., the "communications" phase is entered. In the communications phase, the transmitter now precodes the data before transmission using any of the well-known precoding techniques, e.g., Tomlinson precoding. An example of which is shown in FIG. 2. In FIG. 2, a data signal is applied to a Tomlinson precoder comprising adder 605, mod-2L element 610, and filter 615. Adder 605 subtracts a signal developed by filter 615, described below, from the data signal, x(n). The output signal 606 of adder 605 is applied to mod-2L element 610, which performs as known in the art, to provide an output data symbol stream 611. For example, mod-2L element 610 maps the output signal 606 to a position in a signal point constellation. This mapping is performed using modulo 2L arithmetic, where L is the size of a signal point constellation. FIG. 3 shows an illustrative signal point constellation, where L=7+1. The output data symbol stream 611 is applied to transmitter 620, which develops a signal for transmission. The output data symbol stream 611 is also applied to filter 615, which filters this signal in accordance with the polynomial functions, or filter response vector, $\underline{f}(n)$ using the above-mentioned set of coefficient values, $f_i(n)$, (i=0, 1, . . . , N−1). The latter is transmitted from the corresponding receiver after the above-described training phase.

Whatever precoding method is used, the preceding technique utilizes the above-mentioned coefficient values as determined during the initialization phase. Similarly, the receiver processes any received signal in a complementary fashion to remove the preceding, e.g., now incorporating a Tomlinson decoder. If the response of the communications channel remains constant for the transmission period, no further adaptation will be required since the precoding in the transmitter is equivalently performing the feedback function. As such, typically, the DFE section of the receiver is no longer used during the communications phase. However, in case of small changes in the response of the communications channel during the communications phase, a DFE feedback filter can be added to the receiver, initially set to zero. Unfortunately, when changes to the response of the communications channel are moderate or large during the communications phase, adding the DFE causes the error propagation problem that we tried to avoid by using the pre-equalizer in the far-end transmitter. In this situation it is known to either perform a re-train or a "quick retrain," as described in the above cross-referenced United States patent applications. In a quick retrain, only the dominate coefficients are re-calculated and sent back to the far-end transmitter over the reverse channel. In either event, each re-train takes time to both calculate the pre-equalizer coefficients anew and to communicate them back to the far-end transmitter over what is typically a low bandwidth reverse channel.

However, and in accordance with the inventive concept, we have realized that the foregoing error propagation problem can be solved by adapting the pre-equalizer to the changes in the response of the communications channel, using the reverse channel.

Figure 4:
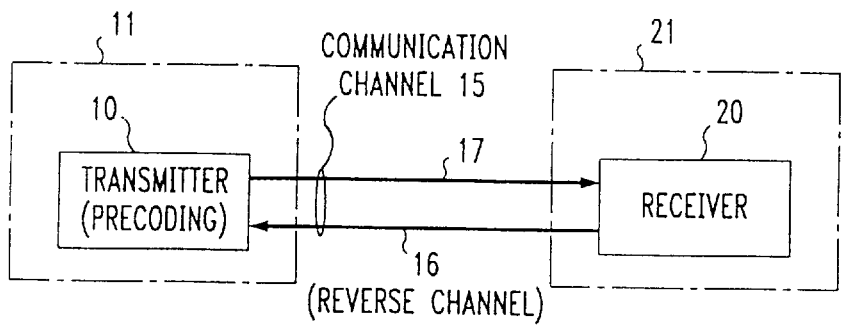
FIG. 4 is a block diagram of a communications system that embodies the principles of the invention.

An illustrative communications system embodying the principles of the invention is shown in FIG. 4. The communications system comprises data communications equipment (DCE) 11, communications channel 15, and DCE 21. For simplicity only a single transmitter/receiver pair is shown as represented by transmitter 10, of DCE 11, and receiver 20, of DCE 21. Transmitter 10 includes precoding and transmits a data signal to receiver 20, via communications channel 15, e.g., over primary channel 17. Receiver 20 communicates an adaptation signal, in accordance with the principles of the invention, to transmitter 10 over reverse channel 16. Although primary channel 17 and reverse channel 16 are shown as separate channels for simplicity, they are not so limited and represent any single, or plurality, of communications channels that enables transmission in both directions whether half-duplex, or full-duplex, over any number of different types of facilities (such as is found in the public-switched-telephone network). For example, reverse channel 16 can be a control channel that exists on a full-duplex primary communications link between transmitter 10 and receiver 20, thus enabling the inventive concept to also be practiced in the corresponding receiver (not shown) associated with DCE 11 and a transmitter (not shown), associated with DCE 21.

Figure 5:
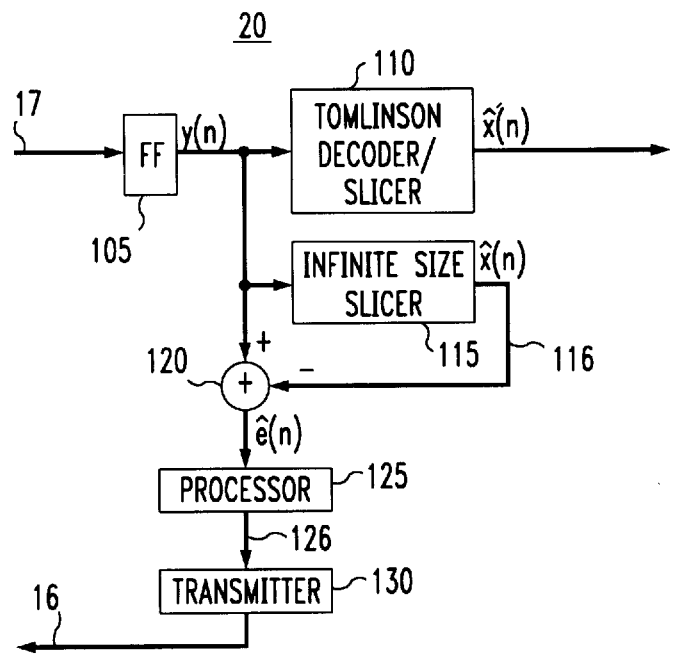
FIG. 5 is a block diagram of a receiver, embodying the principles of the invention.

FIG. 5 is an illustrative block diagram of receiver 20 in accordance with the principles of the invention. The elements of receiver 20, other than the inventive concept, are well-known and will not be described in detail. Further, receiver 20 has been simplified to focus on the inventive concept, e.g., typically there is other receiver circuitry between feedforward filter 105 and communications channel 15. Finally, it is assumed that the communications system is in the above-described communications phase. That is, an initial set of equalizer coefficients has already been generated by receiver 20 and sent back to transmitter 10 over reverse channel 16. Receiver 20 comprises feedforward filter (FF) 105, Tomlinson decoder/slicer 110, infinite size slicer 115, adder 120, processor 125 and transmitter 130. A received data signal for processing is applied to feed forward filter 105, from primary channel 17. Feedforward filter 105 whitens the noise present in the received data signal to generate the output signal y(n). The latter is applied to Tomlinson decoder/slicer 110, infinite size slicer 115, and adder 120. Tomlinson decoder/slicer includes circuitry that performs in a complementary fashion to the Tomlinson precoder of transmitter 10 to provide an estimate, x̂(n), of the actually transmitted data symbol, x(n).

Immediately after switching to the communications phase, y(n) is, ideally, ISI free (a small ISI level may still be produced due to misadjustment in the pre-equalizer) and the additive noise is close to white. Let e(n)≡y(n)−x(n). Since transmitter 10 incorporates preceding, transmitter 10 has an ideal reference for x(n)—namely x(n) itself. Therefore, and in accordance with the inventive concept, samples of y(n) contain sufficient information for adapting the pre-equalizer of transmitter 10 and can simply be communicated back to transmitter 10 over reverse channel 16 (ignoring for the moment adder 120 and infinite size slicer 115). For example, a few bits per sample of y(n) can be transferred to transmitter 10 every K time instants. However, it should be noted that the convergence rate will be slower than that of an adaptive DFE directly located in the receiver. This convergence rate can be increased to a degree by either increasing the data rate on the reverse channel (typically not an attractive systems option), or, where the data rate for the reverse channel is fixed, by reducing the number of bits required for each sample of y(n).

Consequently, although samples of y(n) could be directly sent back to transmitter in accordance with the inventive concept, it is preferable to accelerate the convergence of the pre-equalizer (described below) of transmitter 10 in a different fashion. In particular, and in accordance with the inventive concept, an error signal is developed for transmission from DCE 21 to DCE 11 such that the number of bits required for representing the error signal is less than the number of bits required for y(n).

As shown in FIG. 5, adder 120 of receiver 20 develops an approximation (denoted by ê(n)) of the error signal e(n) by using an estimation of the transmitted data, x̂(n), which is developed by infinite size slicer 115. The latter is required since a form of modulo preceding is used. In particular, the estimate x̂'(n) developed by Tomlinson decoder/slicer 110 may generate a large error at the boundary of the signal point constellation due to the modulo nature of the preceding For example, the received signal point may be on one side of the constellation but the sliced signal point is on the opposite side, which would yield a large error value. Therefore, infinite size slicer 115 is configured to mathematically represent an infinite signal point constellation. That is, there are always more rows, and columns, of signal points presumed to be available when performing the slicing operation. Since x̂(n) is only used in this context to generate an error signal, it is of no consequence to the subsequent recovery of the actually transmitted data from x̂'(n). Processor 125 processes the error signal estimate, ê(n), in any one of a number of ways (some of which are described below) to generate an adaptation signal 126 for transmission back to transmitter 10 over reverse channel 16, via transmitter 130 of DCE 21.

Figure 6:
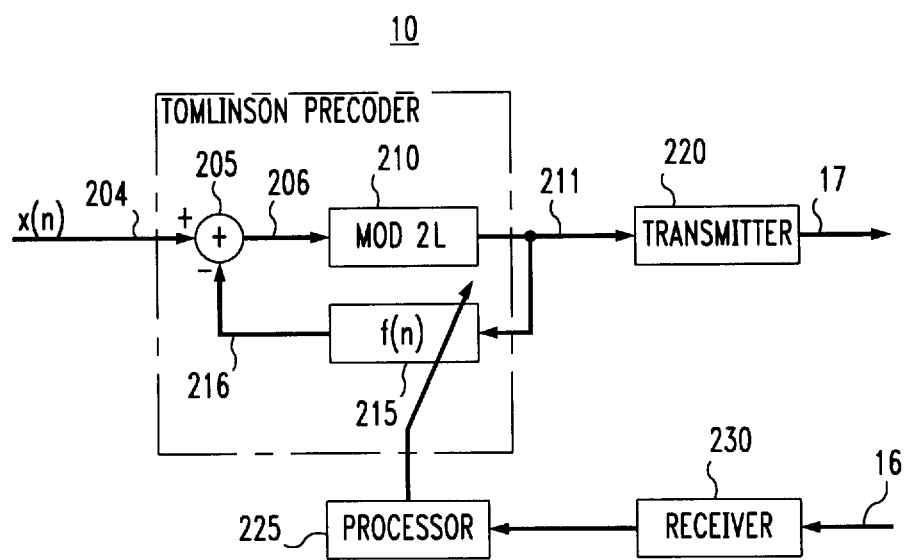
FIG. 6 is a block diagram of a transmitter embodying the principles of the invention.

FIG. 6 is an illustrative block diagram of a portion of DCE 11 in accordance with the principles of the invention. FIG. 6 is similar to FIG. 2 described above except for the addition of receiver 230 and processor 225. The latter receives the above-mentioned adaptation signal from receiver 230 of DCE 11, via reverse channel 16, and adapts the coefficient values, $f_i(n)$, (i=0, 1, ..., N−1) of filter 215 to thereby alter the filter response vector $\underline{f}(n)$ without performing a re-train. The processor 225 operates to generate an error signal as a function of the adaptation signal and a data signal that is not pre-coded, and then update values of the set of coefficients as a function of the error signal.

Figure 7:
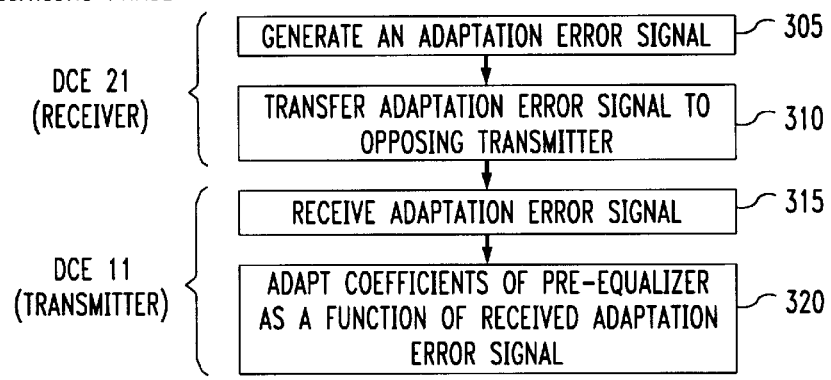
FIG. 7 is an illustrative flow diagram for generating an adaptation signal in accordance with the principles of the invention.

FIG. 7 shows a generalized method in accordance with the principles of the invention as described above. In this method, processor 125 of DCE 21 generates an adaptation signal in step 305 and transfers this signal to DCE 11 via reverse channel 16 in step 310. Processor 225 of DCE 11 recovers the adaptation signal from reverse channel 16 in step 315 and then adapts the coefficient values, $f_i(n)$, (i=0, 1, ..., N−1) of filter 215 as a functions of the received adaptation signal in step 320. Since the reverse channel data rate available for transferring information related to this adaptation is typically limited, an efficient adaptation method should be employed.

Figure 8:
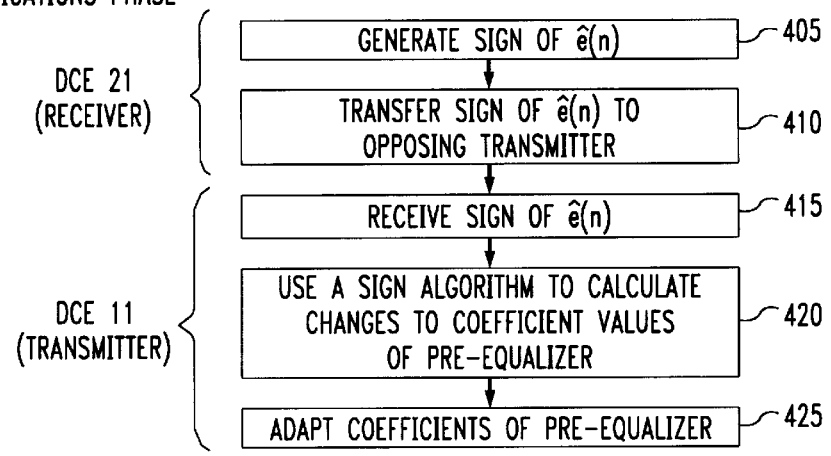
FIG. 8 is another illustrative flow diagram for generating an adaptation signal in accordance with the principles of the invention.

One method of generating an efficient adaptation signal in DCE 21 for adapting a pre-equalizer in DCE 11 is shown in FIG. 8. In this method, processor 125 of DCE 21 generates the sign of ê(n) in step 405 and transfers the sign of ê(n) to DCE 11 via reverse channel 16 in step 410. The value of the sign of ê(n) is based upon one sample per data block of length K. Processor 225 of DCE 11 recovers the sign of ê(n) from reverse channel 16 in step 415 and using any well-known sign algorithm calculates the changes to the coefficient values in step 420. (Sign algorithms are known in the art. For example, see V. J. Mathews and S. H. Cho, "Improved convergence analysis of stochastic gradient adaptive filter using the sign algorithm," IEEE Trans. Acoust., Speech and Signal Process., vol. ASSP-35, pp. 450–454, 1987; and E. Masry and F. Bullo, "Convergence analysis of the sign algorithm for adaptive filtering," IEEE Trans. Inform. Theory, Vol. 37, pp. 1470–1475, 1991.) In step 425, processor 225 adapts the coefficient values, $f_i(n)$, (i=0, 1, ..., N−1) of filter 215. In this case, the adaptation of the pre-equalizer coefficients takes the form:

$$f_i(n+1)=f_i(n)+2\mu(sgn[\hat{e}(n)]\hat{x}(n-i)), \tag{2}$$

It should be noted that only one bit per sample is required for the case of a real filter, and two bits for a complex filter, which is typically well within any bandwidth constraints for a reverse channel. If $\mu$ is very small, the difference in steady state errors between the LMS and the sign algorithms is not large (when the convergence speed is fixed). As shown in equation(2), there must be proper synchronization between ê(n) and x(n−i) when updating the respective i-th coefficient.

Figure 9:
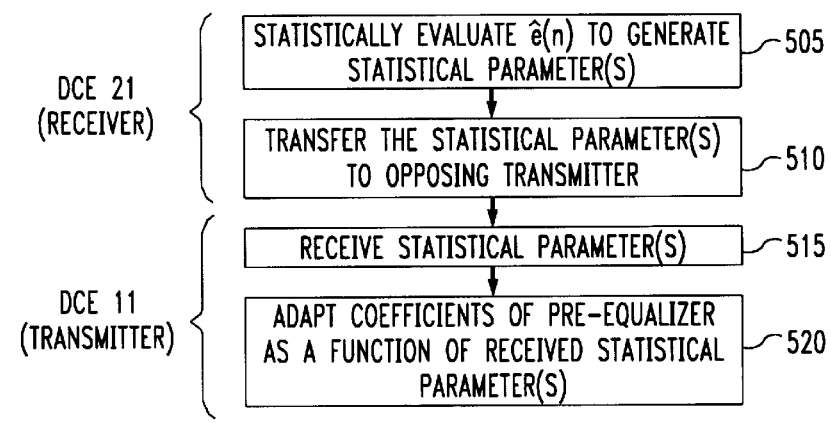
FIG. 9 is another illustrative flow diagram for generating an adaptation signal in accordance with the principles of the invention.

Another method of generating an adaptation signal in DCE 21 for adapting a pre-equalizer in DCE 11 is shown in FIG. 9. In particular, processor 125 statistically processes ê(n) to generate at least one statistical parameter in step 505 and transfers the statistical parameter(s) to DCE 11 via reverse channel 16 in step 510. This method is aimed at utilizing the data available in receiver 20 for the K samples (whereas the adaptation of the sign algorithm is based on one sample per data block of length K), and avoiding the need for synchronization between ê(n) and x(n−i). For example, let $\sigma_e^2$ be the variance of the error e(n). Assuming the e(n) is ergodic, $\sigma_e^2$ can be evaluated by:

$$\sigma_e^2 = \frac{1}{K} \sum_{n=1}^{n=K} e^2(n). \tag{3}$$

The adaptation of the i-th coefficient can be performed by:

$$f_i(n)=f_i(n-1)-\mu\hat{\nabla}_i, \tag{4}$$

where $\hat{\nabla}_i$ is an estimation of the gradient of $\sigma_e^2$. Derivation of equation (3) yields the following estimation for the gradient:

$$\hat{\nabla}_i = -\frac{2}{K} \sum_{n=1}^{n=K} \hat{e}(n)\hat{x}(n-i). \tag{5}$$

It is easy to see that by using this type of averaging in step 505 (hereafter referred to as gradient estimation), the variance of the minimum error in the estimation of the gradient is reduced by a factor of K. Note, that the misadjustment is proportional to this variance. Hence, the adaptation step size can be increased for obtaining a desired misadjustment, provided that the increased step size would ensure convergence. Increasing the step size would also accelerate the convergence of the pre-equalizer. Notice that gradient estimation is mostly effective for slow varying channels, where the channel is quasi-stationary for a period of K transmitted symbols. In this example, a set of values of $\hat{\nabla}_i$ for each coefficient is calculated by processor 125 in step 505 and then transmitted to DCE 11 in step 510. Processor 225 of DCE 11 recovers the statistical parameter(s), here represented by $\hat{\nabla}_i$ for each of the coefficients in step 515. Processor 225 then adapts the coefficient values, $f_i(n)$, (i=0, 1, ..., N−1) of filter 215 in accordance with equation (4) in step 520.

A disadvantage of the above-described gradient estimation method is the need to transfer through the reverse channel different information for each coefficient, whereas in the sign algorithm only one bit is required for the adaptation of all the coefficients. As a result, the gradient estimation method uses more bandwidth than the above-mentioned use of a sign algorithm. However, the gradient estimation method can be further modified so as to reduce the bandwidth required over the reverse channel. For example, requirements of the reverse channel data rate can be reduced by transferring over the reverse channel only a few bits per coefficient for representing $\hat{\nabla}_i$. Indeed, even one bit may be considered (due to the accuracy of the estimation which is based on an average error). Yet another variation is to only adapt a few dominant coefficients of the pre-equalizer in the transmitter. Recall that the aim of performing adaptation of the pre-equalizer is eliminating error propagation, mostly caused by a few ISI coefficients. The remaining coefficients can be used to adapt a DFE in the receiver during the communications phase.

It should be noted that the mean square error, $E\{e^2(n)\}$, is small after the initialization process. As such, the mean squared error may serve as a figure-of-merit for the adaptation step size. Increase in the mean squared error may be interpreted as an increase in the misadjustment. In this case the pre-equalizer can increase the step size (using the reverse channel) for a short period in order to accelerate the adaptation.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, as illustrated above, the adaptation signal can take many forms and only a few illustrative suggestions were described above. For example, the adaptation signal can represent a sequence of k-bit size words, where each k-bit size word represents the location of the first non-zero bit in a corresponding value of, e.g., $\hat{e}(n)$, as opposed to the value of $\hat{e}(n)$ itself. This approach, in effect, sends the most significant, non-zero bit(s) of the signal used for adaptation.

Further, although Tomlinson preceding was illustrated, any precoding scheme can be used in conjunction with the inventive concept. For example, the precoding specified by CCITT modulation standard V.34 could also be used with correspondingly straightforward changes in the receiver structure. This proposed scheme can be used in either an uncoded or coded communications system.

Also, although the invention is illustrated herein as being implemented with discrete functional building blocks, e.g., slicers, filters, etc., the functions of any one or more of those building blocks can be carried out using one or more appropriate programmed processors, e.g., the above-described pre-equalizer and processor of transmitter 10 can be implemented together in a suitably programmed digital signal processor.

What is claimed:

1. A data communications network having a startup phase of operation for establishing data communication and a communication phase of operation for communicating a data signal, the data communications network comprising:
   a transmitter;
   a receiver coupled to the transmitter via a transmit channel and a reverse channel;
   a precoder in the transmitter configured to filter a transmitted data signal x(n) from the transmitter to the receiver, the precoder having a plurality of filter coefficients;
   a first processor in the receiver configured to generate an adaptation signal based upon an estimated error signal $\hat{e}(n)$, where the estimated error signal $\hat{e}(n)$ is defined by $\hat{e}(n)=y(n)-\hat{x}(n)$, where $\hat{x}(n)$ is an estimate of the transmitted data signal x(n), and y(n) is a received data signal at the receiver, said received data signal y(n) being the transmitted data signal x(n) as altered by the transmit channel; and
   a second processor in the transmitter configured to adapt the plurality of filter coefficients in response to the adaptation signal, the adaptation signal being received from the first processor via the reverse channel during said communications phase of operation.

2. The data communications network of claim 1, wherein the estimate of the transmitted data signal $\hat{x}(n)$ is generated by an infinite size slicer.

3. The data communications network of claim 1, wherein the adaptation signal is defined as the sign of $\hat{e}(n)$.

4. The data communications network of claim 1, wherein the adaptation signal is obtained by statistically processing $\hat{e}(n)$.

5. The data communications network of claim 3, wherein the second processor adapts the plurality of filter coefficients in response to the adaptation signal according to the formula $f_i(n+1)=f_i(n)+2\mu(\text{sgn}[\hat{e}(n)]\hat{x}(n-i))$ where $f_i(n)$ are the plurality of filter coefficients, and $\mu$ is an adaptation step size.

6. A transmitter apparatus having a startup phase of operation for establishing data communication with a receiver apparatus and a communication phase of operation for communicating a data signal to the receiver, the transmitter apparatus comprising:
   a data output disposed to couple to a transmit channel which is coupled to the receiver apparatus;
   a channel input disposed to couple to a reverse channel which is coupled to the receiver apparatus;
   a data input disposed to couple to a data communications equipment, said data input receiving a data signal therefrom;
   a precoder in the transmitter configured to filter a transmitted data signal x(n), the precoder having a plurality of filter coefficients; and
   a processor configured to adapt the plurality of filter coefficients in response to an adaptation signal received at said channel input during said communications phase of operation, the adaptation signal being generated based upon an estimated error signal $\hat{e}(n)$, where the estimated error signal $\hat{e}(n)$ is defined by $\hat{e}(n)=y(n)-\hat{x}(n)$, where $\hat{x}(n)$ is an estimate of the transmitted data signal x(n), and y(n) is a received data signal at the receiver, said received data signal y(n) being the transmitted data signal x(n) as altered by the transmit channel.

7. The transmitter apparatus of claim 6, wherein the estimate of the transmitted data signal $\hat{x}(n)$ is generated by an infinite size slicer.

8. The transmitter apparatus of claim 6, wherein the adaptation signal is defined as the sign of $\hat{e}(n)$.

9. The transmitter apparatus of claim 6, wherein the adaptation signal is obtained by statistically processing $\hat{e}(n)$.

10. The transmitter apparatus of claim 8, wherein the second processor adapts the plurality of filter coefficients in response to the adaptation signal according to the formula $f_i(n+1)=f_i(n)+2\mu(\text{sgn}[\hat{e}(n)]\hat{x}(n-i))$ where $f_i(n)$ are the plurality of filter coefficients, and $\mu$ is an adaptation step size.

11. A receiver apparatus having a startup phase of operation for establishing data communication with a transmitter apparatus and a communication phase of operation for receiving a transmitted data signal from the transmitter apparatus, the receiver apparatus comprising:
   a data input disposed to couple to a transmit channel which is coupled to the transmitter apparatus;

a channel output disposed to couple to a reverse channel which is coupled to the transmitter apparatus; and a processor in the receiver apparatus configured to generate an adaptation signal based upon an estimated error signal ê(n), where the estimated error signal ê(n) is defined by ê(n)=y(n)−x̂(n), where x̂(n) is an estimate of the transmitted data signal x(n), and y(n) is a received data signal at the receiver, said received data signal y(n) being the transmitted data signal x(n) as altered by the transmit channel, the adaptation signal being transmitted to the transmitter device over the reverse channel while in the communications phase, the transmitter adapting a plurality of filter coefficients in a precoder in response to the adaptation signal.

12. The transmitter apparatus of claim 11, wherein the estimate of the transmitted data signal x̂(n) is generated by an infinite size slicer.

13. The transmitter apparatus of claim 11, wherein the adaptation signal is defined as the sign of ê(n).

14. The transmitter apparatus of claim 11, wherein the adaptation signal is obtained by statistically processing ê(n).

15. The transmitter apparatus of claim 13, wherein the second processor adapts the plurality of filter coefficients in response to the adaptation signal according to the formula $f_i(n+1)=f_i(n)+2\mu(sgn[ê(n)]x̂(n-i))$ where $f_i(n)$ are the plurality of filter coefficients, and $\mu$ is an adaptation step size.

16. A data communications network having a startup phase of operation for establishing data communication and a communication phase of operation for communicating a data signal, the data communications network comprising:

a transmitter;

a receiver coupled to the transmitter via a transmit channel and a reverse channel;

a precoder in the transmitter configured to filter a data signal transmitted from the transmitter to the receiver, the precoder having a plurality of filter coefficients;

means in the receiver for generating an adaptation signal based upon an estimated error signal ê(n), where the estimated error signal ê(n) is defined by ê(n)=y(n)−x̂(n), where x̂(n) is an estimate of the transmitted data signal x(n), and y(n) is a received data signal at the receiver, said received data signal y(n) being the transmitted data signal x(n) as altered by the transmit channel; and means in the transmitter for adapting the plurality of filter coefficients in response to the adaptation signal, the adaptation signal being received from the means in they receiver via the reverse channel during said communications phase of operation.

* * * * *